United States Patent [19]

Boissonneault

[11] Patent Number: 5,156,517

[45] Date of Patent: Oct. 20, 1992

[54] REMOVABLE HOIST SYSTEM

[76] Inventor: Gaston Boissonneault, 391 Morin Avenue, Sudbury, Ontario, P3C 5A4, Canada

[21] Appl. No.: 664,831

[22] Filed: Mar. 5, 1991

[51] Int. Cl.$^5$ .................... B60P 1/04; B66C 23/42
[52] U.S. Cl. .................... 414/467; 212/187; 212/232; 212/254; 212/265; 414/541
[58] Field of Search .......... 414/467, 539–543, 414/550, 560; 212/180–182, 187, 223, 232, 234, 244, 253, 254, 265

[56] References Cited

U.S. PATENT DOCUMENTS

| 245,544 | 8/1881 | Morgan | 212/253 |
|---|---|---|---|
| 360,578 | 4/1887 | Francis | 212/180 |
| 1,584,117 | 5/1926 | Mitchell | 212/182 |
| 2,512,988 | 6/1950 | Adams | 212/65 |
| 2,565,091 | 8/1951 | Reed | 212/65 |
| 2,792,951 | 5/1957 | White | 414/541 |
| 2,862,628 | 12/1958 | Coates et al. | 212/229 |
| 2,930,499 | 3/1960 | Landen | 414/541 |
| 3,578,179 | 5/1971 | Fujioka | 212/180 |
| 3,847,292 | 11/1974 | William et al. | 414/541 |
| 4,493,603 | 1/1985 | William et al. | 414/541 |

FOREIGN PATENT DOCUMENTS 2112737 7/1983 United Kingdom ............ 414/543
2160170 12/1985 United Kingdom ............ 212/231

Primary Examiner—Sherman D. Basinger
Attorney, Agent, or Firm—Sixbey, Friedman, Leedom & Ferguson

[57] ABSTRACT

A removable hoist system for a doorway of a van which comprises, when in position, a post vertically mounted in the doorway and an arm having one end secured to the post. The arm during operation extends horizontally from the post and a lift mechanism is secured to the other end of the arm, for lifting or lower objects with respect to the van. A lower plate is secured to the floor of the van where the post is mounted and an aperture centrally positioned in the plate, and an upper plate is secured to a frame portion of the van in the upper part of the doorway, vertically above the lower plate with an aperture centrally positioned in this upper plate. Pins removably received in the aperture of the plates to hold the post in vertical position during operation outwardly extend from the ends of the post. The post is of a length so that when it is in position with its pins in the apertures there is sufficient clearance at the top to permit lifting of the post so that the lower pin is clear of the aperture for removal of the post. The plates have sufficient load bearing strength when secured in position in the van to withstand a predetermined weight of object when lifted or lowered by the lift mechanism.

3 Claims, 1 Drawing Sheet

5,156,517

REMOVABLE HOIST SYSTEM

The present invention relates to a removable hoist system for a doorway of a light duty van.

BACKGROUND OF THE INVENTION

There is presently a need for a device for lightweight vans, particularly when used for commercial purposes, which will facilitate lifting of heavy objects into the van from the outside, or lowering of such objects to the ground from within the van. At the present time, such objects are generally manually raised and lowered.

There has been a need for a mechanical means to assist the lifting and lowering of such heavy objects in such service vans. Truck mounted lifting cranes such as those described and illustrated for example in Coates et al U.S. Pat. No. 2,862,628 have not been suitable for adaption to service vans since they require special brackets for mounting at both top and bottom. Permanently mounted track hoists are described and illustrated for example in Adams U.S. Pat. No. 2,512,988 issued Jun. 27, 1950 and Reed U.S. Pat. No. 2,565,091 issued Aug. 21, 1951. An externally mounted truck hoist is described and illustrated in U.S. Pat. No. 3,578,179 of Fujioka issued May 11, 1971. Again that construction requires special brackets at top and bottom making it effectively a permanently mounted structure.

It is an object of the present invention to provide a sturdy, lightweight hoist system for a light duty service van, whereby a hoist may be easily installed in and removed from the doorway of the van, to thereby permit easier handling of heavy objects with respect to the van.

SUMMARY OF THE INVENTION

In accordance with the present invention there is provided a removable hoist system for a doorway of a van which comprises, a post to be vertically mounted in the doorway and an arm having one end secured to the post. The arm during operation extends horizontally from the post and a lift means is secured to the other end of the arm, for lifting or lower objects with respect to the van. A lower plate is secured to the floor of the van where the post is mounted and an aperture centrally positioned in the plate, and an upper plate is secured to a frame portion of the van in the upper part of the doorway, vertically above the lower plate with an aperture centrally positioned in this upper plate. Longitudinally extending at opposite ends of the post are pins removably received in the apertures of the plates to hold the post in vertical position during operation. The post is of a length so that when it is in position with its pins in the apertures there is sufficient clearance at the top to permit lifting of the post so that the lower pin is clear of the aperture for removal of the post. The plates have sufficient load bearing strength when secured in position in the van to withstand a predetermined weight of object when lifted or lowered by the lift means.

In a preferred embodiment, the post and arm are collapsible. In particular the arm is pivotally secured to the post near its top. A brace member having two ends is pivotally secured at one end near the bottom of the post with the other end being releasably securable to the arm to support the arm horizontally.

The hoist system according to the present invention is simple to install and operate. The plates when mounted in the doorway of the van so as not to obstruct the closing of the van doors, require no latch pins or special brackets for mounting of the posts in vertical orientation or removal thereof. To remove the hoist itself, the post is simply lifted to clear the lower pin from its aperture, pulled back at the bottom and lowered to clear the upper pin from its aperture, for removal in a matter of seconds, without tools pins or latches. No special brackets are required at the top of the post—only a small hole must be made in the frame, in alignment with the aperture in the upper plate. No alterations at all are required in the bottom of the truck, other than to secure of the plate to the bottom.

BRIEF DESCRIPTION OF THE DRAWINGS

These and other objects and advantages of the invention will become apparent upon reading the following detailed description and upon referring to the drawings in which.

Figure 1:
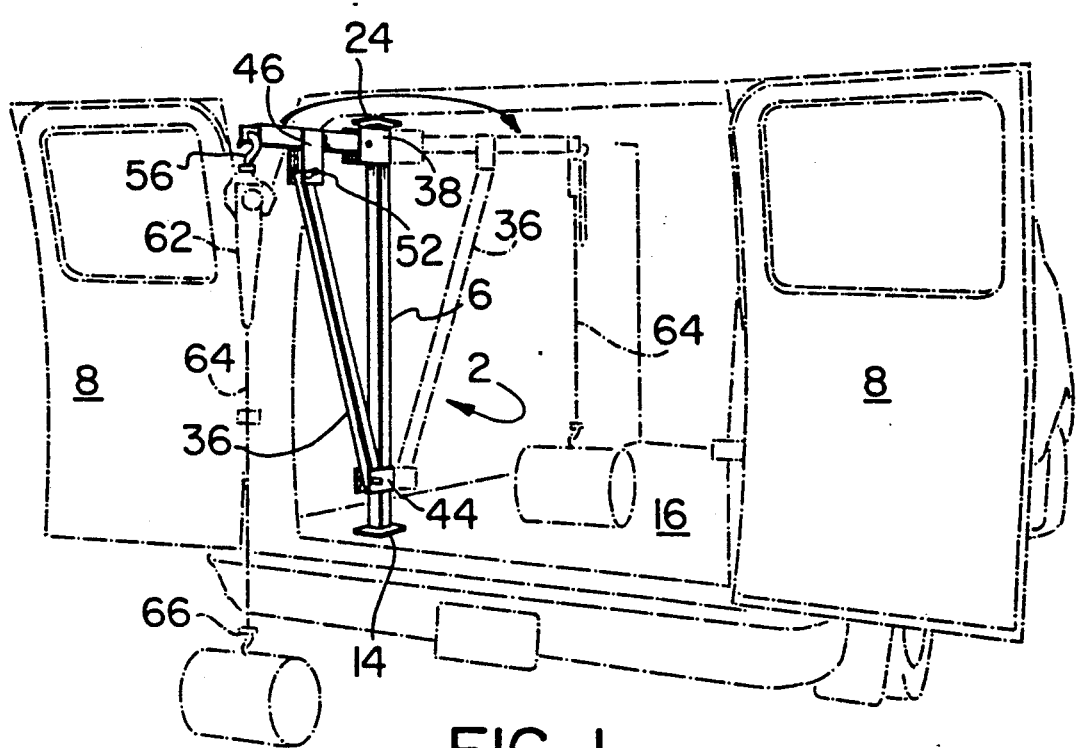
FIG. 1 is a perspective view of a light duty service van, from the rear, in which a hoist system according to the present invention has been installed.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a hoist system 2 mounted on a light duty service van 1. Hoist system 2 comprises a post or mast 6 which is preferably mounted in the rear entrance doorway of a van so that doors 8 will not close when post 6 is in position, but will close when post 6 is removed from position, in a manner which will be explained in more detail hereinafter. This is designed as a safety feature.

Post 6 is provided with bottom pin 10 and top pin 12 (FIG. 3) for removably mounting the post with respect to the van. In this regard, a bottom plate 14 is fastened, by bolts or other appropriate fasteners, to floor 16 in the rear doorway of the van 4 as illustrated. An aperture 18 is centered within bottom plate 14 as illustrated, for removably receiving bottom pin 10 of post 6. Above the doorway and secured to the door frame 20 of van 4 by means of bolts or other fastening means is a top plate 24. Aligned vertically above aperture 18 and centered in plate 24 is an aperture 26 to removably receive top pin 12 of post 6. A depression 28 is drilled into frame 20, aligned with aperture 26, to receive the upper portion of top pin 12 as illustrated in FIG. 1.

The positioning of plates 14 and 24 in the doorway of van 4 does not interfere with the opening and closing of doors 8.

Upper pin 12 is somewhat more elongated than bottom pin 10 and a clearance 30 is provided between the top 32 of post 6 and top plate 24 to ensure that post 6 may be readily removed from or positioned in plates 14 and 24, and securely held in position by these plates when installed in position as illustrated in FIG. 1. To insert post 6 into position, top pin 12 is fully inserted in the aperture 26 of top plate 4 and depression 28 in door frame 20. This provides clearance at the bottom to enable bottom pin 10 to be moved into position and dropped into aperture 18 of bottom plate 14. For removal from this position, post 6 is elevated so that bottom pin 10 is removed from and clear of bottom plate 14, enabling post 6 to be swung sideways, away from vertical orientation, until it is entirely clear of bottom plate 14 and floor 16 of the van. Top pin 12 may then be removed from aperture 26 and depression 28 by downward movement of post 6.

Figures 2, 3:
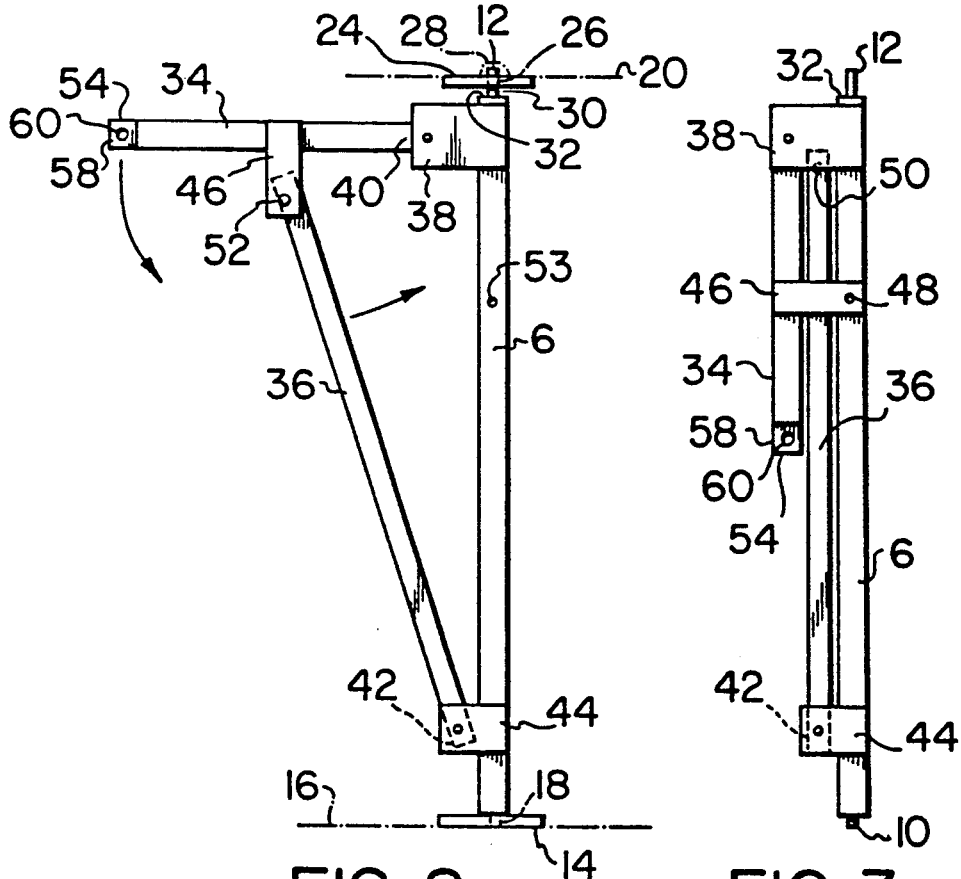
FIG. 2 is a side view of the hoist system of FIG. 1.
FIG. 3 is a side view of the hoist system of FIG. 1 in collapsed position, illustrating the manner in which it collapses.

Pivotally secured to post 6 are arm 34 and brace member 36. More particularly, a pair of plates 38 is secured to both sides of post 6 near its top, and inner end 40 of arm 34 is pivotally bolted to the plates through aligned apertures in the plates 38 and inner end 40 of arm 34. Similarly the lower end 42 of brace member 36 is bolted between spaced plates 44 secured to a lower portion of post 6 as illustrated. As can be seen in FIG. 3, the positioning of the pivot points of arm 34 with respect to plates 38 and brace member 36 with respect to plates 44 is such as to permit the arm and brace member to be collapsed into orientation parallel with post 6 for storage purposes.

A pair of plates 46 are secured to either side of arm 34 in downwardly depending fashion, as illustrated in FIGS. 1 and 2, and provided with apertures 48 (FIG. 3) which are aligned with aperture 50 in the free end of brace member 36 so that a pin 52 may be removably received in these apertures, when aligned, to maintain and support arm 34 in horizontal position when hoist system 2 is operational. When pin 52 is removed, arm 34 and brace member 36 may be pivoted into collapsed position as illustrated in FIG. 3, for storage. Brace member 36, in this collapsed position, is nested between plates 46 to provide a neat, compact arrangement for storage purposes. It is preferred that, in this collapsed position, apertures 48 be aligned with an aperture 53 in post 6 so that placing pin 52 through these aligned apertures will secure the arm and brace member in collapsed position parallel to post 6.

Post 6, arm 34 and brace member 36 are preferably made of square or rectangular tubular metal stock, although any other material providing light weight sturdy construction may be used.

To free end 54 of arm 34 is releasably secured a chain block 56 as illustrated in phantom in FIG. 1. Preferably a plate 58 is secured, to be in vertical orientation when hoist system 2 is operational, to the free end 54 of arm 34, plate 58 being provided with an aperture 60 to which chain block 56 may be hooked. Chain block 56 itself is preferably provided with a hand-operated rachet means 62, by which chain 64 may be raised or lowered, any appropriate object securing means 66 being provided on chain 64.

As previously indicated, to install the hoist or crane provided by post 6, arm 34 and brace member 36 in position, post 6 is simply lifted vertically so that top pin 12 is inserted in aperture 26 in top plate 24 and depression 28 in the van frame 20, and then, with bottom pin 10 aligned with aperture 18 in bottom plate 14, post 6 is lowered so that bottom pin 10 is seated in aperture 18 in bottom plate 14. In this position, a portion of pin 12 remains seated in upper plate aperture 26. With both pins thus seated in the apertures of their corresponding plates, arm 34 and brace member 36 are then unfolded from storage position until the apertures 48 in plates 46 are aligned with brace member aperture 50. Pin 52 is inserted in these aligned apertures so that arm 34 is held in horizontal position. Chain block 56 is mounted on plate 58 and hoist system 2 is then operational.

The size, shape and location of plates 14 and 24 are selected so as to ensure that the hoist system 2 is securely maintained in position and can withstand a predetermined weight of an object when lifted or lowered by chain block 56. These plates are positioned, as well, so that they do not obstruct the opening and closing of doors 8.

It has been ascertained through testing that the hoist system 2 according to the present invention will lift objects of up to one-half to three-fourths of a ton with little or no difficulty.

Pins 10 and 12 are preferably of circular cross-section so as to permit post 6 and arm 34 to pivot about an axis through these pins when post 6 is in operative position with respect to plates 14 and 24 (FIG. 1).

It will be understood that no holes are required in the bottom of the vehicle for insertion of the bottom pin 10, as that pin is carried entirely by bottom plate 14. As well no special brackets are required at the top. The only structural modification required for the top of the doorway is the small depression 28 which is formed behind aperture 26 of top plate 24 and the holes for receiving fastening means to secure top plate in position. The device according to the present invention requires no special brackets or pins for removal or installation and is easy to install for use and to remove and collapse for storage.

Thus it is apparent that there has been provided in accordance with the invention an improved removable hoist system for a doorway of a van that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A removable hoist system for a doorway of a van comprising a post to be vertically mounted in the doorway, an arm pivotally movable between an extended horizontal position substantially perpendicular to said post and a collapsed vertical position substantially parallel to said post, an arm mounting means secured to said post for pivotally mounting a first end of said arm in spaced relationship to said post, a lift means secured to a second end of the arm for lifting or lowering an object with respect to the van, a lower plate secured to the floor of the van having an aperture positioned therein, an upper plate secured to a frame portion of the vane in the upper part of the doorway, vertically above the lower plate and an aperture positioned in the upper plate, longitudinally extending pins at opposite ends of the post removably received in said apertures of the upper and lower plates to hold the post in a vertical position during operation, the post being of a length so that when the post is in position with said pins in the plate apertures, there is such sufficient clearance between the post and the upper plate to permit lifting of the post so that the pin in the aperture of the lower plate is lifted clear of the aperture in the lower plate for removal of the post, the upper and lower plates having sufficient load bearing strength when secured in position in the van to withstand a predetermined weight of an object when lifted or lowered by the lift means, a brace member having a first brace end and a second brace end, said first brace end being pivotally secured to a lower portion of said post, a brace support means secured to said arm intermediate the first and second ends thereof, said brace support means extending substantially perpendicular to said arm, connector means releasably engaging said second end of said brace member with said brace support means when said arm is in said extended horizontal position, said brace member being pivotal vertically parallel and adjacent to said post when released from said brace support means by said connector means so that said arm is in said collapsed position, said brace support means being releasably securable to said post when said arm is in the collapsed position, a brace mounting means secured to said post to pivotally mount said first brace end in spaced relation to said post, said arm mounting means operating to mount said first end of said arm a greater distance from said post than the distance from said post that said first brace end is mounted by said brace mounting means.

2. The removable hoist system of claim 1 wherein said brace member is pivotal parallel to said post between said post and said arm when said arm is collapsed.

3. The removable hoist system of claim 2 wherein said brace support means includes spaced plates adapted to receive the second end of said brace member therebetween, said spaced plates being adapted to extend along opposite sides of said brace member and said post when said arm is collapsed.

* * * * *